L. H. HOUGHTON.
PIPE COUPLING.
APPLICATION FILED SEPT. 26, 1910.

1,186,523.

Patented June 6, 1916.

Witnesses:

Inventor:
Lemuel H. Houghton,
By L. B. Coupland,
Atty.

UNITED STATES PATENT OFFICE.

LEMUEL H. HOUGHTON, OF ELKHART, INDIANA, ASSIGNOR OF TWO-THIRDS TO CLAYTON E. CRAFTS, OF CHICAGO, ILLINOIS.

PIPE-COUPLING.

1,186,523.

Specification of Letters Patent. Patented June 6, 1916.

Application filed September 26, 1910. Serial No. 583,829.

*To all whom it may concern:*

Be it known that I, LEMUEL H. HOUGHTON, a citizen of the United States, residing at Elkhart, in the county of Elkhart and State of Indiana, have invented certain new and useful Improvements in Pipe-Couplings, of which the following is a specification.

This invention relates to the class of hose coupling attachments that are more especially used in connection with air-brake systems; and has for its principal object to provide a device of this character in which the two companion members comprising the hose coupling connection are separably joined together by integral locking stop means, as will be hereinafter set forth in detail.

Figure 1:
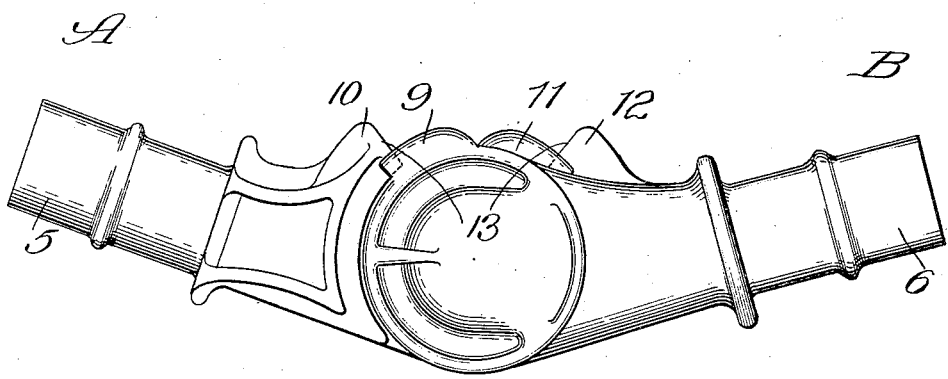
Figure 2:
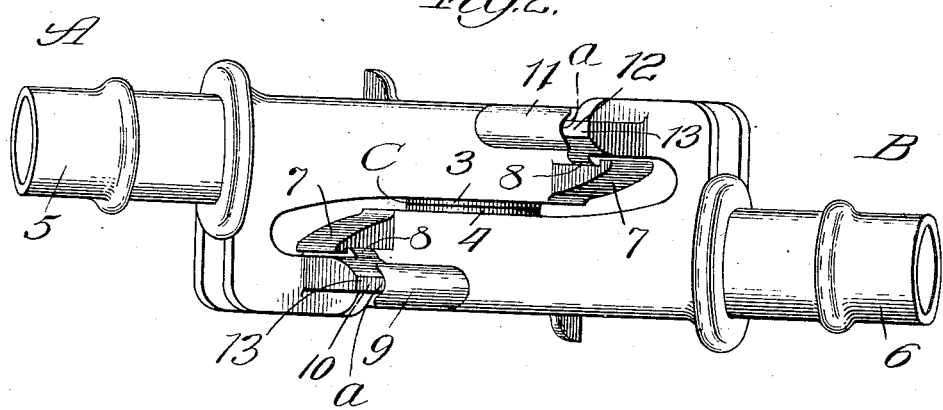

Figure 1 is an elevation of a device embodying the improved features. Fig. 2 is a plan of the same.

The companion train coupling members A and B are of the ordinary construction, so that the description will be more especially limited to the improved parts.

The two members or sections A and B are shown joined together in their working position and are separable on a line C. The members are chambered and have openings on the inner joining faces thereof which come into coincident relation when joined together. The relative position of these openings is indicated by the packing-ring gaskets 3 and 4 which are seated in the faces of the openings and form the necessary tight joint. The pipe-ends 5 and 6 provide for the attachment of the train hose (not shown) forming the usual communicating connection between two cars when coupled together and provides for the passage of the fluid pressure.

Each coupling member is provided on its inner joining face, with a beveled lug 7, which when the members are being joined together, comes in contact with the adjacent opposing surface 8 and has a wedging, clamping action in gradually drawing the members tightly together. In mechanism of this character it is necessary that the coupling members be joined together in such a positive and direct manner as to guard against the possibility of accidental displacement by the jar and vibration incident to the movement of a railway train. Another requirement in this time of fast moving trains, is that the locking feature must permit of the members being instantly joined together and as quickly separated.

The coupling connection is usually located below the car platform out of the way and the companion members so joined together as to turn the pipe-ends 5 and 6 upward at approximately the angle shown in Fig. 1. This angle brings the pipe-ends more in line with that followed by the flexible hose connection and prevents any bend or kink that would interfere with a free flow of the fluid pressure.

The coupling member A is provided with an integral rib 10 and an engaging stop-shoulder 11 in line therewith, as best shown in Fig. 2. The companion member B is provided with a corresponding rib 9 and an engaging lug 12. The engaging ends of the ribs 9 and 11 are recessed or slightly curved out as at $a$, for the engagement of the nose-ends 13 of the stop-lugs 10 and 12. This feature provides a positive fixed stop and prevents the coupling members from turning past the point of function when being joined together. The fixed stops would be the same were the engaging ends of the ribs 9 and 11 straight across, but by curving out the meeting ends as shown, the coupling members may be made to have a wedging-together action and lessen the liability of accidental separation.

It will be understood that the coupling members are joined together and separated by a turning movement. This arrangement entirely dispenses with the use of pins, bolts or other separable parts that are ordinarily employed in connection with this class of pipe or train couplings.

Having thus described my invention, what I claim is—

In a pipe-coupling of the class described, a coupling-member provided with an integral rib and an engaging stop-shoulder, a companion coupling member provided with a corresponding rib and stop-shoulder, the rib of one coupling member being in line with and engaging the stop-shoulder of the companion coupling member, whereby said coupling members are adapted to be detachably joined together with a wedging action against accidental separation.

In testimony whereof I affix my signature in presence of two witnesses.

LEMUEL H. HOUGHTON.

Witnesses:
A. H. STANTON,
G. E. CHURCH.

Copies of this patent may be obtained for five cents each, by addressing the "Commissioner of Patents, Washington, D. C."